United States Patent
Van Groenigen

(10) Patent No.: US 7,854,195 B2
(45) Date of Patent: Dec. 21, 2010

(54) NEEDLE WITH AIR DUCT

(75) Inventor: Jan C. Van Groenigen, Varsenare (BE)

(73) Assignee: CNH America LLC, New Holland, PA (US)

( * ) Notice: Subject to any disclaimer, the term of this patent is extended or adjusted under 35 U.S.C. 154(b) by 238 days.

(21) Appl. No.: 12/166,075

(22) Filed: Jul. 1, 2008

(65) Prior Publication Data
US 2009/0007805 A1 Jan. 8, 2009

(30) Foreign Application Priority Data
Jul. 4, 2007 (GB) .................................. 0712921.6

(51) Int. Cl.
*A01F 15/14* (2006.01)
*A01D 59/06* (2006.01)
(52) U.S. Cl. ........................... 100/8; 100/19 R; 100/24; 56/343; 289/16
(58) Field of Classification Search ............... 100/8, 100/19 R, 24; 289/2, 16; 56/343
See application file for complete search history.

(56) References Cited

U.S. PATENT DOCUMENTS

| 3,020,829 | A |  | 2/1962 | Pearson |
| 4,285,285 | A | * | 8/1981 | Chambers et al. ......... 112/80.08 |
| 5,347,920 | A |  | 9/1994 | Vansteelant |
| 7,318,376 | B1 |  | 1/2008 | Ensminger et al. |
| 7,458,620 | B2 | * | 12/2008 | Rotole et al. .................. 289/16 |

FOREIGN PATENT DOCUMENTS

AU 606668 B2 2/1991

* cited by examiner

*Primary Examiner*—Jimmy T Nguyen
(74) *Attorney, Agent, or Firm*—Patrick M. Sheldrake; Michael G. Harms

(57) ABSTRACT

A baler has a bale chamber and a needle movable through the bale chamber to pass a strand of twine from one side of the bale chamber to a knotter located on the opposite side, the twine being engaged by a tip of the needle. In the invention, pressurized air is directed at the needle tip. The supply of pressurized air may be discontinuous and timed to coincide only with certain phases of the needle operating cycle. The air stream avoids crop material being caught up in the knots formed by the knotter.

10 Claims, 2 Drawing Sheets

NEEDLE WITH AIR DUCT

BACKGROUND OF THE INVENTION

The present invention relates to square balers and in particular to the mechanism used for tying the bales with lengths of twine and making knots in the twine.

Balers are machines that can be self-propelled but are more commonly towed behind a tractor and driven from the tractor power take-off shaft. They fall into two types, namely round balers and square balers. Round balers are used to produce cylindrical bales that are normally wrapped in a mesh or a film after they have been formed. Square balers produce square-sided bales that are tied by separate loops of twine spaced across their width of each bale.

The present invention is only applicable to square balers. To explain, by way of background, the manner in which square balers are constructed, reference will be made to FIG. 1 of the accompanying drawings. This drawing is derived from U.S. Pat. No. 5,347,920, which is imported herein by reference, and will be described herein only to the extent necessary for an understanding of the present invention.

The baler comprises a main frame 10 fitted with a pair of ground-engaging wheels 12 and a tow bar 14, arranged to be attached to a tractor (not shown). A pick-up mechanism 16 picks crop material, typically straw or similar crop residue, which lies on the ground having for example been laid down in swaths by a combine harvester. The crop material is delivered to a feed chamber 18 from where it is transferred to a bale case or chamber 20 in which a bale of crop material is formed.

A plunger 22 is reciprocable within the bale chamber 20 to act upon wads of crop material transferred from the feed chamber 18 into the bale chamber 20 and to compress these wads into a bale which, during formation, is moved progressively along the bale chamber 20 from left to right as seen in FIG. 1. A completed bale is tied with twine by a knotter 24 and rearwardly discharged from the machine.

The bale chamber 20 comprises a forward portion 30 with fixed dimensions and a rearward portion 32 of which the dimensions can be varied by means of movable top and side rails 34. A tension adjusting mechanism 36 is provided for moving the rails 34 in order thereby to vary the cross-sectional area of region where the bale is formed and thus control the density of the bales produced.

As several strands need to be tied around each bale, several individual knotters 24 are transversely spaced on top of the bale chamber 20 and all operate in the following identical manner. Tying a strand of twine around a bale starts with clamping a leading end of the strand 30 in a twine holder from where it projects downwardly over a billhook and a twine guiding member through the bale chamber 20. The twine holder, billhook and guiding member of the knotter need not be described herein in detail as the present invention is not directly concerned with the operation of the knotter. The method of operation of knotters is itself well known and described in numerous published patent specifications.

As the crop material is compressed and progressively moved towards the exit of the bale chamber 20, the twine is taken along so that it extends along the top of the bale, down the leading end thereof and beneath the lower surface of the bale. From there, each twine extends through an eye in the forward end of a respective curved needle 40 which forms part of a pivotable needle assembly 42.

A star wheel 44 which is operatively coupled to the knotters 24 monitors the bale length as a bale is formed progressively. When a bale has been formed to a desired extent, the tying operation is initiated by moving the needle assembly 42 to project the tip of each needle 40 upwardly through the bale case 10 and into the region of the billhook and the twine holder of the knotter in order to carry a trailing strand of twine into association with the leading strand of twine already clamped in the twine holder. At that time, the leading and trailing strands are knotted together by the billhook of the knotter. To free the knotted loop from the knotter 24, both strands are cut from the twine holder by moving the twine guiding member, which supports a knife, across the billhook meanwhile stripping the knot therefrom.

It will be appreciated by a person skilled in the art that the cyclic movement of the needle assembly 36 not only ensures the delivery of a trailing strand of twine to the twine holder 32 for tying a completed bale but at the same time initiates the formation of a new bale by providing the twine holder 32 with a new leading strand of twine.

A knotter operating in this manner draws twine from a single supply roll and produces a loop of twine with a single knot. Other knotting systems are known in which two lengths of twine are drawn from separate rolls and knotted together at the commencement and termination of forming each bale. In such so-called double-knotters, after a first knot in the two lengths of twine has been made at the end of forming a bale, the two knotted strands are cut from their respective supply rolls and a second knot is formed in the two strands from the two supply rolls to commence the following bale. Such double-knotters offer the advantages that the twine need not be held firmly in the knotter during the bale forming phase and the twine does not need to slip over the surface of the bale as the bale is formed but merely moves with the bale as it grows. The present invention is applicable to balers with single knotters and double knotters.

A problem that occurs in the knotting mechanisms of big balers, especially those with double knotters, is caused by a build up of crop material around the knotter 24, having been brought up by the needles 40, and also by a build up of crop material on and around the eye of the needle, which often comprises a pair of rollers to guide the twine smoothly through the needle. When such crop material becomes trapped in a knot as it is being formed, it can weaken the knot and allow it later to work itself free.

It should also be noted in this context that the baler plunger 22 is provided with needle slots. The needles cannot pass through the compressed material and therefore they are moved upwardly when the plunger is in its fully compacting position. The needles then pass through the slots in the front face of the plunger. Crop material may be hanging over the entrance area where the needles enter the baling chamber. Crop material also may be present in the needle slots. All this crop material can be taken up with the needle top as this top is not sharp but has the two rollers installed. If crop is hanging on the rollers, it may be difficult for the top roller to pick up the top twine leading to a miss-tie.

SUMMARY OF THE INVENTION

With a view to mitigating the foregoing problem, there is provided a baler having a bale chamber and a needle movable through the bale chamber to pass a strand of twine from one side of the bale chamber to a knotter located on the opposite side, the twine being engaged by a tip of the needle, characterized in that means are provided on the needle for directing a pressurized air stream towards the tip of the needle.

There may be an advantage in maintaining the air stream while the needle is stationary and a bale is being formed. However, to conserve energy and avoid unnecessary noise, it is preferred for the supply of pressurized air to be discontinuous and timed to coincide only with certain phases of the needle operating cycle.

If the pressurized air is timed to occur during the passage of the needle through the bale chamber towards the knotter, it acts to dislodge crop material from the path of the needle.

If timed to occur when the tip of the needle is adjacent the knotter, the air stream will serve to keep the knotter free of crop material.

The pressurized air may additionally be timed to occur during the return movement of the needle through the bale chamber away from the knotter in order to maintain the tip of the needle free of crop material.

A valve for controlling the supply of pressurized air may conveniently be connected to or incorporated within the axle about which the needle pivots.

As an alternative to securing pressure pipes to the outer surface of a needle, a needle may itself be integrally formed with a passage through which air may be directed towards its tip.

BRIEF DESCRIPTION OF THE DRAWINGS

The invention will now be described further, by way of example, with reference to the accompanying drawings, in which.

DESCRIPTION OF THE PREFERRED EMBODIMENT(S)

Figure 1:
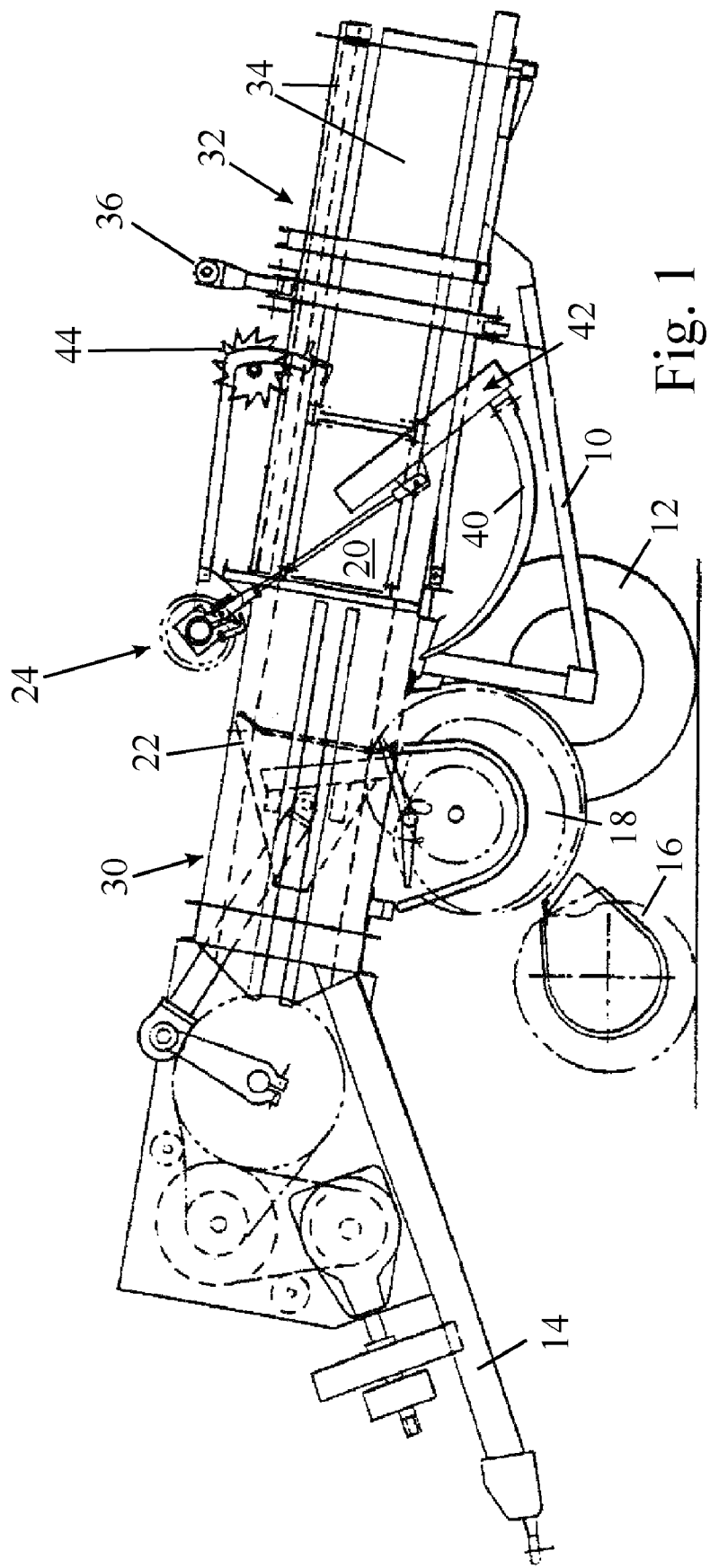
FIG. 1 is a side view of a rectangular baler.
Figure 3:
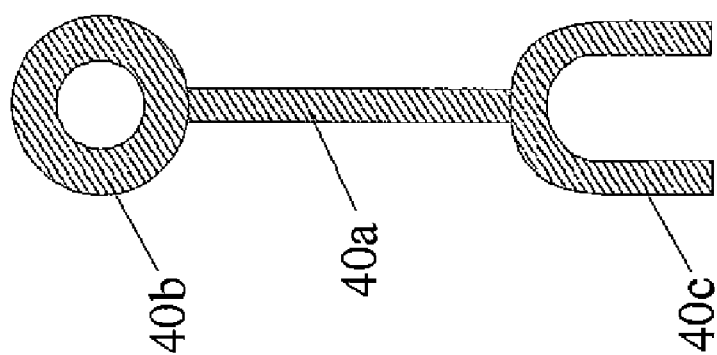
FIG. 3 is a section along the line III-III in FIG. 2.
Figure 2:
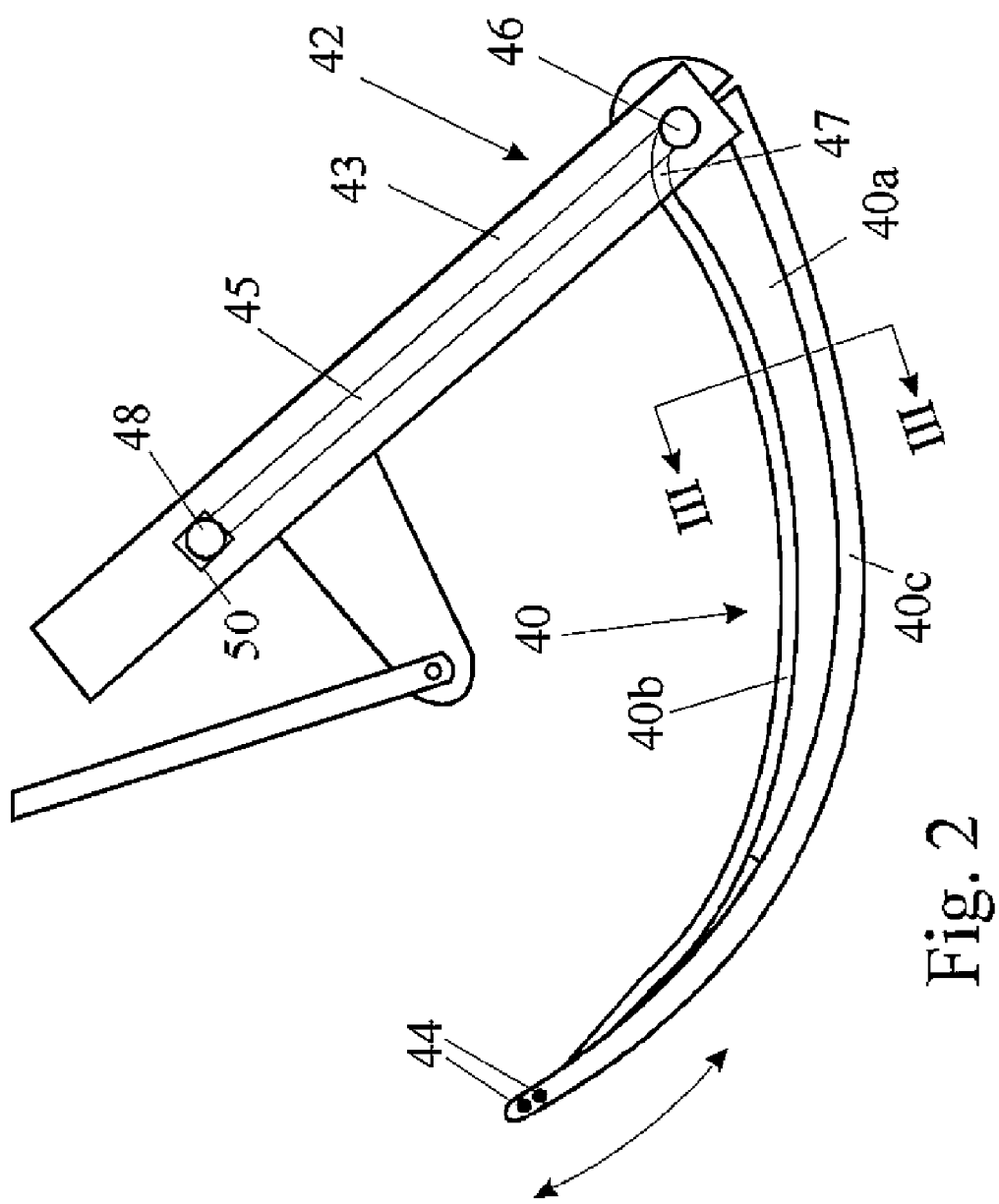
FIG. 2 shows a side view of a needle assembly of a baler of the invention.

Referring to FIGS. 2 and 3, a needle assembly 42 is shown having a needle 40 which at its tip carries a pair of spaced rollers of which only the pivot axles 44 are shown in FIG. 2. The twine to be tied around a bale, which is drawn from a supply roll by way of a tensioning device (neither of which is shown in FIG. 1) passes between the two rollers at the tip of the needle 40, and then around three sides of the bale being formed. When the bale is to be tied, the needed moves through the bale chamber 20, as represented by the arrow in FIG. 2, to complete the encircling of the bale and offer the strand of twine into the knotter 24.

In the present invention, compressed air is guided along the needle 40 and a blast of air is directed at the tip of the needle. The conduit carrying the compressed air, in the case of the embodiment shown in FIGS. 2 and 3 is formed as an integral part of the needle 40. More particularly, as shown in the section of FIG. 3, the needle comprises a central web portion 40a, a tubular portion 40b along its upper edge for carrying compressed air to the tip of the needle and a twine guide portion 40c in the shape of an inverted "U" along the lower edge of the needle 40.

It is not essential for the compressed air conduit to be formed integrally with the needle in this manner. It may equally well comprise a separate pressure pipe that is suitably held in place on the surface of the needle.

The blast of air at the tip of the needle serves to dislodge crop material during the movement of the needle towards its associated knotter and prevent a build-up of material at the tip of the needle while the needle is moving through the needle slots in the front face of the plunger. Upon arrival at the knotter, the pressurized air blows crop material from the knotter and during the return movement of the needle, the pressurized air serves to keep clean the twine engaging rollers of the needle.

The supply of pressurized air may be discontinuous and timed to coincide only with certain phases of the needle operating cycle, such as during its upward movement through the bale chamber, when it is close to the knotter and/or during its return movement.

A spool valve 50 may be used to control the supply of pressurized air, in which case the spool may be coupled to or formed as part of the axle about which the entire needle assembly pivots.

The needle assembly 42 comprises a yoke 46 to which all the needles 40 are connected. The yoke 46 is a shaft that extends between and is carried by two arms 43 arranged one on each side of the bale chamber and pivotable about pivots 48. As shown in FIG. 2, the yoke 46 is hollow and serves as a buffer of compressed air. The needles 40 are connected to the yoke 46 in such a manner that air from the yoke 46 is guided into each needle channel 40b through a passage 47. Furthermore, air from the tractor compressor or from a reservoir on the baler can be guided into the yoke 46 through the pivots 48 and through a passage 45 formed in at least one of the arms 43, thereby allowing rigid air tubes to be used to carry the compressed air.

Having thus described the invention, what is claimed is:

1. A baler comprising:
   a bale chamber; and
   a needle assembly having a needle movable through the bale chamber to pass a strand of twine from one side of the bale chamber to a knotter located on the opposite side, the twine being engaged by a tip of the needle, and a passage connected to a supply of pressurized air, wherein means are provided on the needle for directing a pressurized air stream from the passage connected to a supply of pressurized air towards the tip of the needle.

2. The baler of claim 1, wherein the supply of pressurized air is discontinuous and timed to coincide only with certain phases of a needle operating cycle.

3. The baler of claim 2, wherein the pressurized air is timed to occur during the passage of the needle through the bale chamber towards the knotter, to dislodge crop material from the path of the needle.

4. The baler of claim 2, wherein the pressurized air is timed to occur when the tip of the needle is adjacent the knotter, the air stream configured to keep the knotter free of crop material.

5. The baler of claim 2, wherein the pressurized air is timed to occur during the return movement of the needle through the bale chamber away from the knotter to maintain the tip of the needle free of crop material.

6. The baler of claim 2, wherein a valve for controlling the supply of pressurized air is connected to or incorporated within an axle about which the needle pivots.

7. The baler of claim 2, wherein a conduit along which the pressurized air flows towards the tip of the needle is formed as an integral part of the needle.

8. The baler of claim 6, wherein the needle is commonly connected to a yoke shaft extending between and carried by two pivotably mounted arms, and wherein the yoke is hollow and serves as a buffer of compressed air.

9. The baler of claim 8, wherein air from the yoke is guided into a channel in each needle which directs a pressurized air stream towards the tip of the needle.

10. The baler of claim 8, wherein compressed air is guided into the yoke through a pivot of at least one of the arms carrying the yoke.

* * * * *